US008054796B2

(12) United States Patent
Berg (10) Patent No.: US 8,054,796 B2
(45) Date of Patent: Nov. 8, 2011

(54) UPLINK ACKNOWLEDGMENT CHANNEL IN WIRELESS COMMUNICATION

(75) Inventor: Heikki Berg, Viiala (FI)

(73) Assignee: Nokia Corporation, Espoo (FI)

( * ) Notice: Subject to any disclaimer, the term of this patent is extended or adjusted under 35 U.S.C. 154(b) by 1293 days.

(21) Appl. No.: 11/635,762

(22) Filed: Dec. 8, 2006

(65) Prior Publication Data

US 2008/0137605 A1 Jun. 12, 2008

(51) Int. Cl.
*H04W 4/00* (2009.01)

(52) U.S. Cl. ........ 370/330; 370/328; 370/338; 370/278; 370/282; 370/277

(58) Field of Classification Search .......... 370/328–349, 370/277, 278, 282; 455/450–454
See application file for complete search history.

(56) References Cited

U.S. PATENT DOCUMENTS

| 7,873,049 | B2 * | 1/2011 | Gaur et al. | 370/392 |
|---|---|---|---|---|
| 2005/0232135 | A1 * | 10/2005 | Mukai et al. | 370/208 |
| 2006/0133262 | A1 * | 6/2006 | Sutivong et al. | 370/209 |
| 2007/0153727 | A1 * | 7/2007 | McBeath et al. | 370/329 |
| 2008/0101211 | A1 * | 5/2008 | Rao | 370/206 |
| 2010/0284326 | A1 * | 11/2010 | Oh | 370/328 |

OTHER PUBLICATIONS

IEEE Standard for Local and Metropolitan Area Networks; Part 16: Air Interface for Fixed and Mobile Broadband Wireless Access Systems; Amendment 2: Physical and Medium Access Control Layers for Combined Fixed and Mobile Operation in Licensed Bands and Corrigendum 1; IEEE Computer Society and the IEEE Microwave Theory and Techniques Society, IEEE Std 802.16e—2005 and IEEE Std 802.16—2004/Cor1-2005 (Amendment and Corrigendum to IEEE Std 802.16-2004), Feb. 28, 2006, pp. i-xxxix and 1-822 (863 pages total).

* cited by examiner

*Primary Examiner* — Kamran Afshar
*Assistant Examiner* — Kathy Wang-Hurst
(74) *Attorney, Agent, or Firm* — Squire, Sanders & Dempsey (US) LLP (57) ABSTRACT

A shared uplink acknowledgment (ACK) channel can be communicated to the payload recipient. The shared uplink ACK channel information can be communicated in the payload message or in a broadcast control channel. Reserving a dedicated time-frequency chunk for these short ACK messages and multiplexing different users to the same time slot with spreading codes having good cross-correlation properties can be used to accomplish such a shared uplink ACK channel.

36 Claims, 8 Drawing Sheets

Fig.7

UPLINK ACKNOWLEDGMENT CHANNEL IN WIRELESS COMMUNICATION

BACKGROUND OF THE APPLICATION

1. Field of the Invention

In a communication system, a shared uplink acknowledgment (ACK) channel can be communicated to a payload recipient in the payload message or a broadcast control channel. Reserving a dedicated time-frequency chunk for these short ACK messages and multiplexing different users to the same time slot with spreading codes having good cross-correlation properties can be used to accomplish such a shared uplink ACK channel. Recipient's ACK channel allocation information (time, frequency, spreading code) can be concatenated to the first message of the data transfer and/or whenever allocation should change. When multiple users are multiplexed into the same time-frequency allocation, overhead from short ACK messages can, thus, be avoided or reduced. This may be especially true in situations in which transmission preambles from different users consume system resources and the ACK message is still much shorter than minimum transmit opportunity allocation.

2. Description of the Related Art

In internet protocol (IP) based communications the link between a base station and a mobile station is usually unbalanced: most of the traffic is in one direction at a time. This same phenomenon also exists in relay and mesh networks. Simultaneous traffic in the opposite direction is usually just acknowledgement signals of successful (for which an ACK is used) or unsuccessful (for which a NACK is used) transmissions. Thus, the direction of transferred data consumes a lot of radio resources, but the other direction should not consume radio resources, since ACK messages are typically very short. Typical applications in which this kind of behavior can be seen are in the areas of downloading and web browsing. This principle can also apply to voice over IP (VoIP) or video communications when automatic repeat request (ARQ) is used with this kind of traffic. For convenience, ACK is used generically for description herein for both affirmative and negative acknowledgments, rather than referring both to ACK and NACK, although one of ordinary skill in the art would understand that a negative ACK is a NACK.

SUMMARY OF THE INVENTION

An embodiment of the present invention can be a system that includes a plurality of terminals and a base station. The base station can be configured to provide a shared uplink ACK channel. The base station can be configured to reserve a dedicated time frequency chunk for short ACK messages. The base station can also be configured to multiplex the plurality of terminals to the same time slot using spreading codes. The base station can also be configured to inform the plurality of terminals of their respective channel allocation information. The plurality of terminals can be configured to receive their respective channel allocation information and provide ACK messages according to their respective channel allocation. The terminals can be configured to receive such a shared uplink ACK channel allocation in the payload of a payload message, and not in a broadcast control message. Alternatively, the terminals can be configured to receive such a shared uplink ACK channel allocation in a broadcast control message.

Another embodiment of the present invention can be a node. The node can include a reception module configured to receive a first signal, a processor configured to process the first signal and produce a second signal, and a transmission module configured to transmit the second signal. The node can be configured to provide a shared uplink ACK channel. The node can be configured to reserve a dedicated time frequency chunk for short ACK messages. The node can also be configured to multiplex the plurality of terminals to the same time slot using spreading codes. The node can also be configured to inform the plurality of terminals of their respective channel allocation information. The node can be a base station or a relay node. The node can be configured to inform a respective terminal of the plurality of terminals in the payload of a payload message to the respective terminal, and not in a broadcast control message. Alternatively, the node can be configured to inform a respective terminal of the plurality of terminals in a broadcast control message.

A further embodiment of the present invention can be a terminal. The terminal can include a reception module configured to receive a first signal, a processor configured to process the first signal and produce a second signal, and a transmission module configured to transmit the second signal. The terminal can be configured to receive shared uplink ACK channel allocation information and provide ACK messages according to their respective channel allocation. The terminal can be configured to receive such a shared uplink ACK channel allocation in the payload of a payload message, and not in a broadcast control message. Alternatively, the terminals can be configured to receive such a shared uplink ACK channel allocation in a broadcast control message.

Yet another embodiment of the present invention can be a method. The method can include providing a shared uplink ACK channel. The method can also include reserving a dedicated time frequency chunk for short ACK messages. The method can further include multiplexing different users to the same time slot with spreading codes. The method can additionally include informing the different users of ACK channel allocation information.

Another embodiment of the present invention is a method. The method includes receiving shared uplink ACK channel allocation information. The shared uplink ACK channel allocation information can be included in a payload of a payload message, and not in a broadcast control message. Alternatively, the shared uplink ACK channel allocation information can be included in a broadcast control message. The method also includes providing ACK messages according to a respective shared uplink ACK channel allocation in the payload.

A further embodiment of the present invention is a computer program embodied on a computer readable medium, encoding instructions for performing a method. The instructions include instructions for reserving a dedicated time frequency chunk for short ACK messages. The instructions also include instructions for multiplexing different users to the same time slot with spreading codes. The instructions further include instructions for informing the different users of ACK channel allocation information.

An additional embodiment of the present invention is a computer program embodied on a computer readable medium, encoding instructions for performing a method. The instructions can include instructions for receiving shared uplink ACK channel allocation information in a payload of a payload message, and not in a broadcast control message. Alternatively, the instructions can include instructions for receiving shared uplink ACK channel allocation information in a broadcast control message. The instructions also include instructions for providing ACK messages according to a respective shared uplink ACK channel allocation.

Yet another embodiment of the present invention can be a node, such as a base station or a relay node. The node can include channel means for providing a shared uplink ACK channel. The node can also include reservation means for reserving a dedicated time frequency chunk for short ACK messages. The node can further include multiplexing means for multiplexing different users to the same time slot with spreading codes. The node can additionally include information means for informing the different users of ACK channel allocation information.

Another embodiment of the present invention is a terminal. The terminal can include reception means for receiving shared uplink ACK channel allocation information. The shared uplink ACK channel allocation information can be included in a payload of a payload message, and not in a broadcast control message. Alternatively, the shared uplink ACK channel allocation information can be included in a broadcast control message. The terminal can also include provision means for providing ACK messages according to a respective shared uplink ACK channel allocation in the payload.

BRIEF DESCRIPTION OF THE DRAWINGS

For proper understanding of the invention, reference should be made to the accompanying drawings, wherein.

DETAILED DESCRIPTION OF THE PREFERRED EMBODIMENTS

Figure 1:
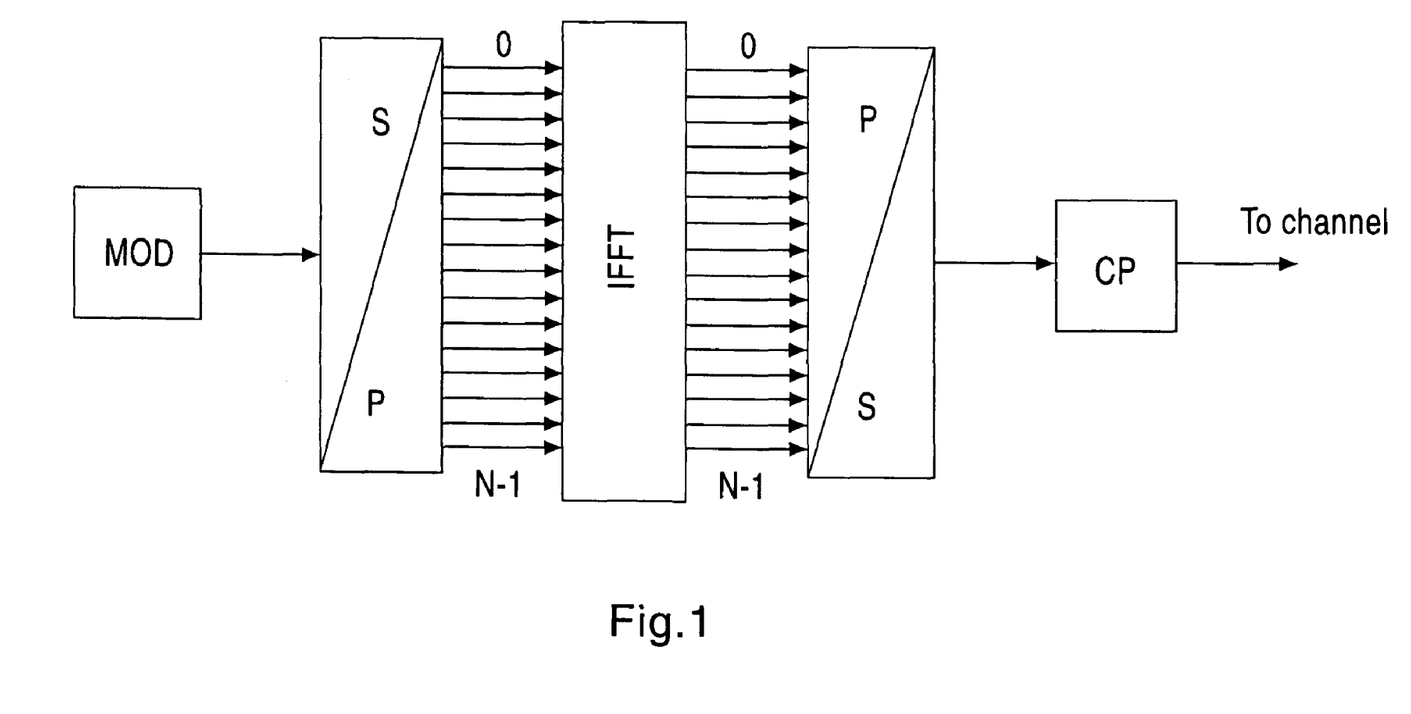
FIG. 1 illustrates a mechanism for an orthogonal frequency-division multiplexing (OFDM) transmitter.

In orthogonal frequency-division multiplexing (OFDM), bandwidth of B is separated into N orthogonal sub-carriers. In typical implementations the number of orthogonal sub-carriers is power of 2 (for example, 64, 128, 256 and so on up to 8192) due to simple realization of orthogonal sub-carriers through a fast Fourier transform (FFT). Selected subcarrier spacing (FFT size) depends on the expected frequency selectivity in the radio channel. Mechanisms that may be required to create OFDM transmission are depicted, for example, in FIG. 1. In FIG. 1, a modulated signal is converted to N parallel signals, processed with a FFT from frequency to time domain, and then again serialized. Before digital to analog (D/A) conversion typically a cyclic prefix (CP) is added to the OFDM symbols. OFDM transmission is used today, for example, in Institute of Electrical and Electronics Engineers (IEEE) standards IEEE 802.11 and IEEE 802.16 as well as in ultra-wideband (UWB) systems.

Figure 2:
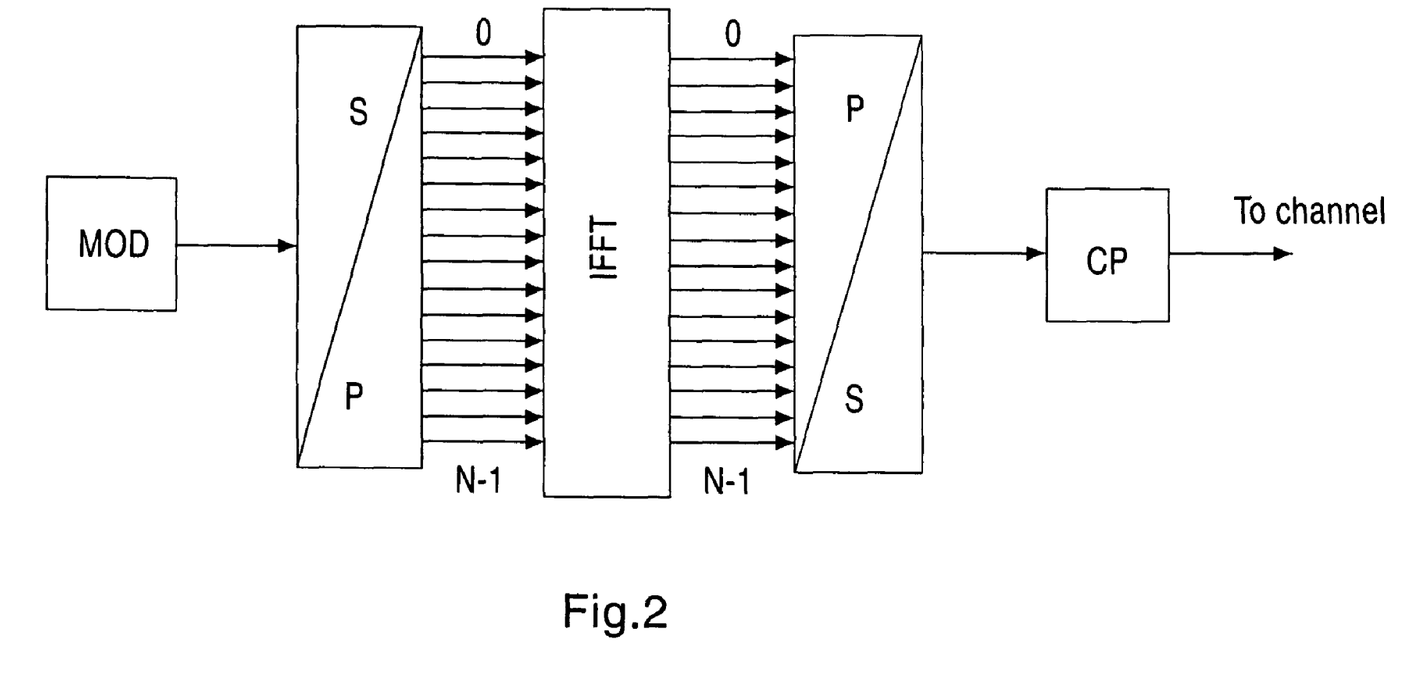
FIG. 2 illustrates an implementation for orthogonal frequency-division multiple access (OFDMA) designed to enable interference control mechanism and frequency domain scheduling by banded (packed) sub-channelization.
Figure 3:
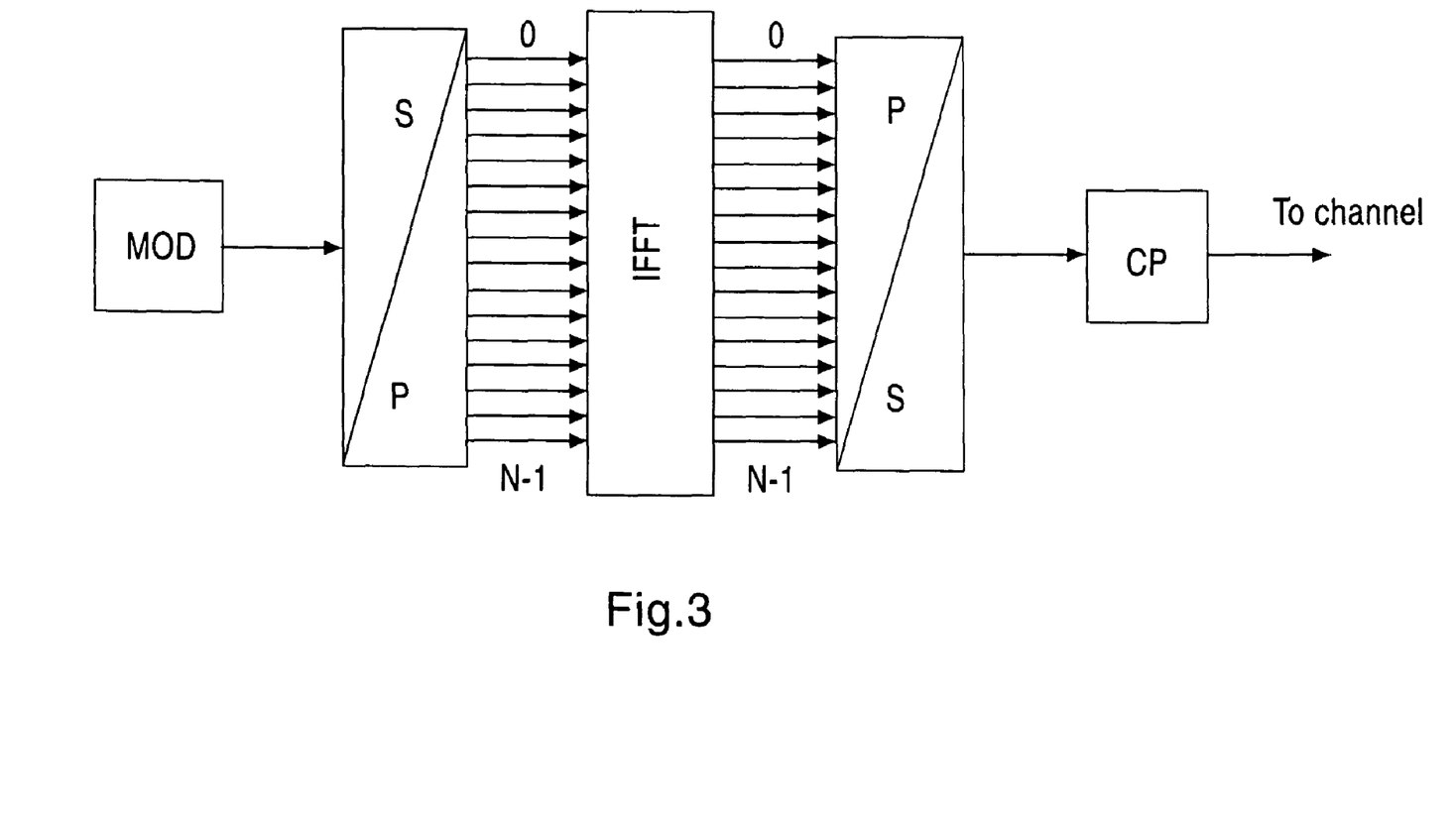
FIG. 3 illustrates an implementation for OFDMA designed to provide a high amount of frequency diversity by distributed sub-channelization.

Orthogonal frequency-division multiple access (OFDMA) is a mechanism to create frequency division multiple access (FDMA) using OFDM. In OFDMA, a useful part of sub-carriers of OFDM signal is divided into a number K of logical sub-channels. These sub-channels can then be assigned to different users. The sub-carriers that belong to a logical sub-channel can either be distributed over the whole useful band giving high amount of frequency diversity (as shown in FIG. 3). Alternatively, the sub-carriers that belong to a logical sub-channel can be packed together (as shown in FIG. 2), which enables interference control mechanisms and frequency domain scheduling but gives low frequency diversity. Systems that use, or plan to use, OFDMA include, for example, IEEE 802.16, long term evolution (LTE), wireless world initiative new radio (WINNER) and Telestra's Next G™ (a wideband code division multiple access (WCDMA) network running at 850 MHz).

As noted above, FIG. 2 illustrates an OFDMA transmitter with banded (packed) sub-channelization. Sub-carriers belonging to the same logical sub-channel are depicted with the same shading as one another. As can be seen in FIG. 2, from top to bottom, the first four sub-channels have the same shading as each other (the darkest shading), the second four sub-channels have the same shading as each other (the next to lightest shading), the third four sub-channels have the same shading as each other (the next to darkest shading), and the last four sub-channels have the same shading as each other (the lightest shading).

As also noted above, FIG. 3 illustrates an OFDMA transmitter with distributed sub-channelization. Sub-carriers belonging to the same logical sub-channel are depicted with the same shading. Although the sub-carriers belonging to the same subchannel are equally spaced (every 4th) they need not necessarily be so. As can be seen from FIG. 3, there are four shadings of sub-channels, and they alternately interspersed. Thus, for example, the sub-carriers of one subchannel (the darkest shading) are shown at the top-most position, fifth position, ninth position, and thirteenth position from the top. In contrast, another sub-channel's subcarriers (the lightest shading) are shown in the fourth, eighth, twelfth, and sixteenth positions from the top.

Figure 5A:
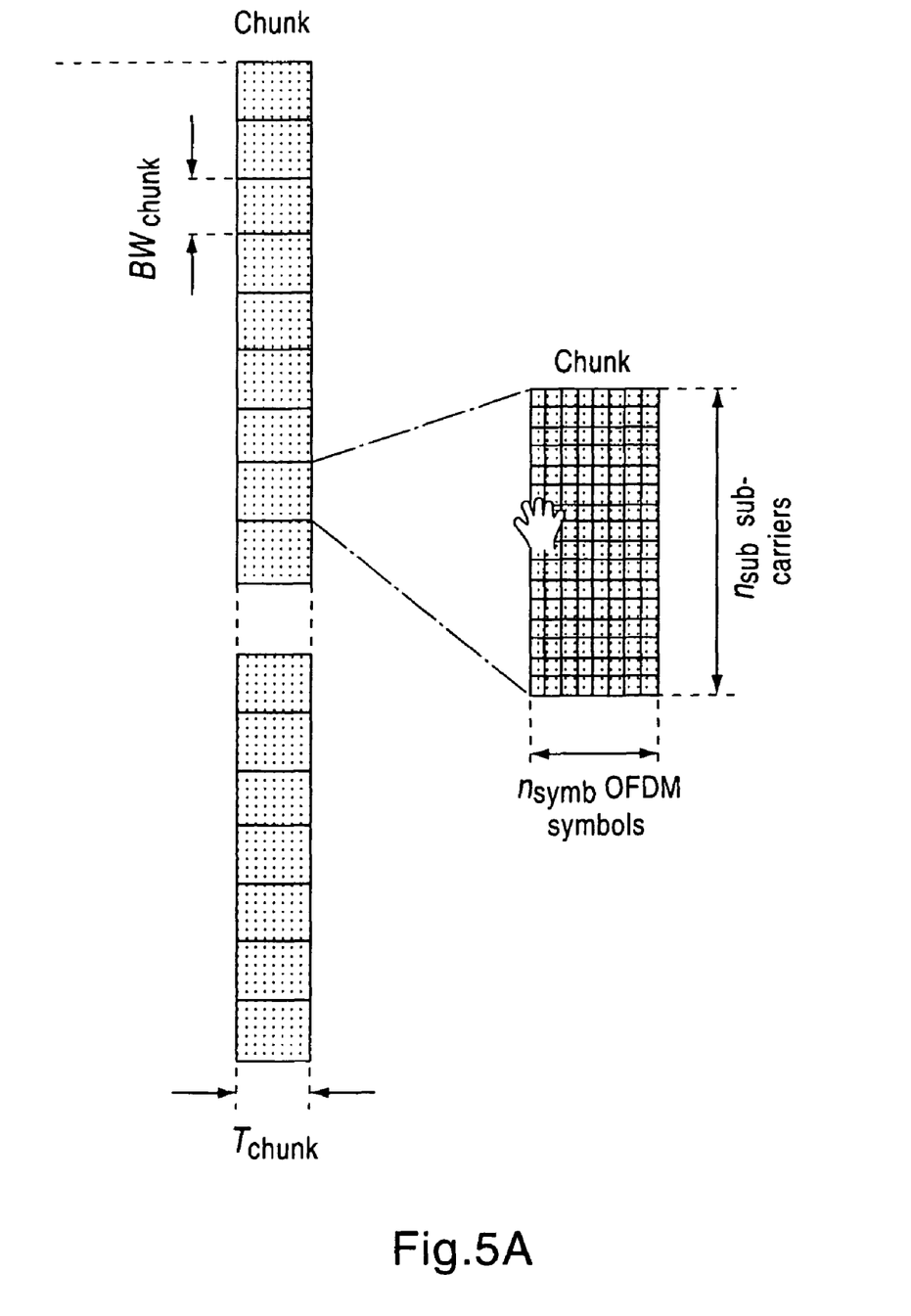
FIGS. 5A and 5B illustrate an example of the implementation of WINNER.
Figure 5B:
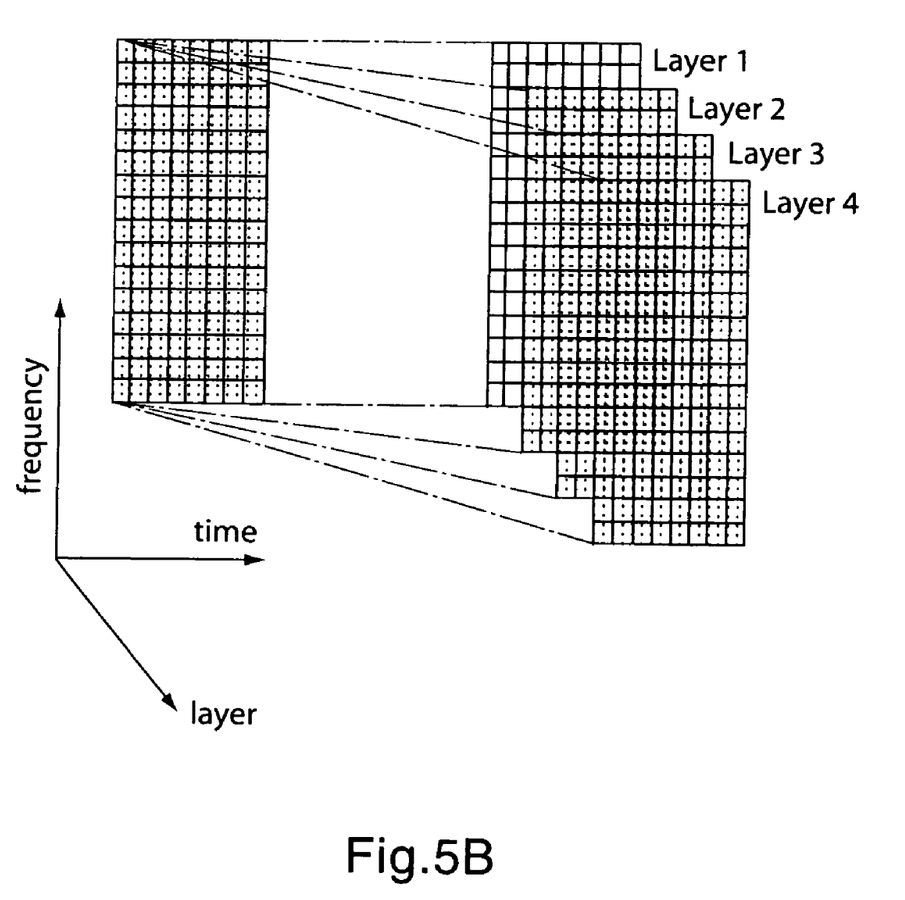

FIGS. 5A and 5B illustrate an example of the implementation of WINNER. As can be seen in FIG. 5A, in WINNER a chunk can be divided by frequency ($BW_{chunk}$) and time ($T_{chunk}$). Furthermore, as shown in FIG. 5A, the chunk can be constituted by $n_{symb}$ OFDM symbols and $n_{sub}$ sub-carriers.

FIG. 5B illustrates that in WINNER, the chunk can be made up of multiple layers (Layer 1, shown without shading, Layer 2, shown with a dark shading, Layer 3, shown with a medium shading, and Layer 4, shown with a light shading). Each of the layers can correspond to a different target. The layers can be transmitted superimposed on one another in time and frequency.

Dedicated allocation for short ACK messages can consume an unnecessarily high amount of system capacity if the system design has not taken the short ACK messages into account. Such overhead can come from padding the short ACK packet to minimum payload length, as well as overhead from preambles and training for channel estimation. In congestion based systems, competition for channel access opportunity and blocking of other users for a random time from channel access can increase the overhead even further.

Different users in OFDM based systems are usually separated either in time (for example, time division multiple access (TDMA)), in frequency (for example, frequency division multiple access (FDMA)), by using spreading codes (for example, multi-carrier code division multiple access (MC-CDMA)), or by using various combinations of such mechanisms.

For example, in a current IEEE 802.11 system, the users transmit one at a time and the transmission is congestion based. Thus, short ACK messages have to compete for transmission opportunity.

If the ACK message cannot be concatenated with regular data transmission to the same transmission packet, short ACK packets can consume a lot of system resources. On the other hand, if the allocation for the ACK messages were dedicated, it could consume a lot of system resources of the scheduled system (at least a minimum allocation unit for a user).

Users in OFDMA based systems get an allocation in a time-frequency (time-sub-channel) grid for their transmission. The same problem, however, exists in OFDMA. Uplink (UL) users may have to compete for the system resources. Alternatively, the allocation can be dedicated, but such dedicated allocation can consume system resources.

Part of the problem is the minimum allocation unit that can be assigned for a user and how it is communicated. This can be seen for instance in the worldwide interoperability for microwave access (WiMAX) system, in whch there is large overhead from downlink (DL) and uplink map (UL-MAP) messages, which point out the user allocations for DL and UL frames. The more users that there are to control, the more capacity the map messages consume, and thus control can consume capacity.

In certain embodiments of the present invention, a shared uplink ACK channel can be communicated to the payload recipient in the payload message rather than using a broadcast control channel. Alternatively, the shared uplink ACK channel can be communicated to the payload recipient in the broadcast control channel. A further aspect of certain embodiments of the present invention is to reserve a dedicated time-frequency chunk for these short ACK messages and to multiplex different users to the same time slot with spreading codes that have good cross-correlation properties. Recipients ACK channel allocation information (for example, time, frequency, spreading code) can be concatenated to the first message of the data transfer and/or whenever allocation should change.

The recipient, thus, can still have opportunity either to choose whether the ACK message would be concatenated to data transfer in the opposite direction (if there is data to be transmitted) or to transmit the ACK message in a dedicated slot.

When multiple users are multiplexed into the same time-frequency allocation, overhead from short ACK messages can be avoided. This is true in situations in which transmission preambles from different users consume system resources and an ACK message is still much shorter than minimum transmit opportunity allocation. This same principle can be applied to cellular systems, relay networks, and mesh networks that use OFDM and/or OFDMA.

Figure 4:
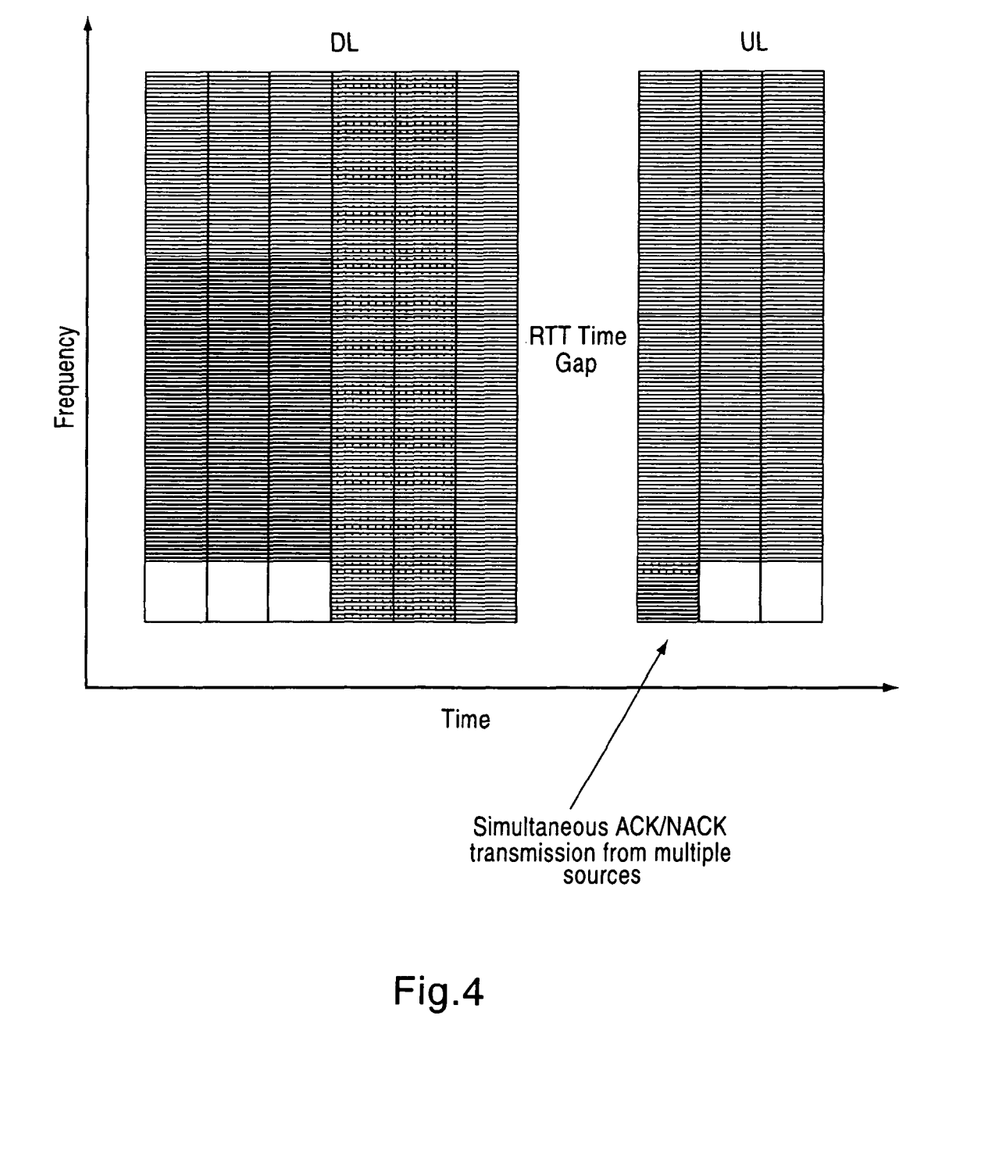
FIG. 4 illustrates an example of one embodiment of the mechanism of the present invention, using OFDMA, illustrating a shared ACK channel.

An example of one embodiment of the mechanism, using OFDMA, is illustrated in FIG. 4. FIG. 4 illustrates OFDMA transmission in both uplink (UL) and downlink (DL) directions in time division duplex (TDD) mode. In the DL direction there are 9 sub-channels*6 slots=54 chunks for allocating DL capacity and 9 sub-channels*3 slots=27 chunks for allocating UL capacity. One of the UL chunks has been allocated for UL ACK's and is shared between 3 users. There are 4 users in the DL part of the frame. Only one of these users has high amount of data to be transmitted in UL direction. The three other users acknowledge their packets with simultaneous transmissions to the UL ACK channel. The three users are separated by a frequency domain spreading code (for example, MC-CDMA).

Simultaneous transmissions to the same OFDM sub-carriers from multiple users can be separated by frequency domain spreading codes (for example, MC-CDMA). One thing that should be taken into account is that the ACK transmissions from the different users should be separable (codes are orthogonal; channels for the different users can be estimated). If there are K sub-carriers in use and spreading factor of S is used, maximum data rate per code used for transmission can be K/S. An example of spreading codes that could be used for the purpose are Walsh-Hadamard codes, though the present invention is not limited to this example embodiment.

The number of users that one could multiplex to the ACK channel can depend on the ratio of minimum transmission opportunity size to the ACK message size.

Thus, certain embodiments of the present invention can solve a problem in which short ACK messages waste UL capacity. Furthermore, certain embodiments of the present invention can be applicable in the situations in which ACK messages are shorter than minimum transmission opportunity allocation. However, because the ACK transmissions may need to arrive to the destination simultaneously the radio network (or base station (BS) and mobile station (MS) operating under its control) may need synchronization. Accordingly, in certain embodiments of the present invention, synchronization can be implemented. For traditional style cellular systems, this may be the case. However, in IEEE 802.11 contention based access this principle may not hold.

Figure 6:
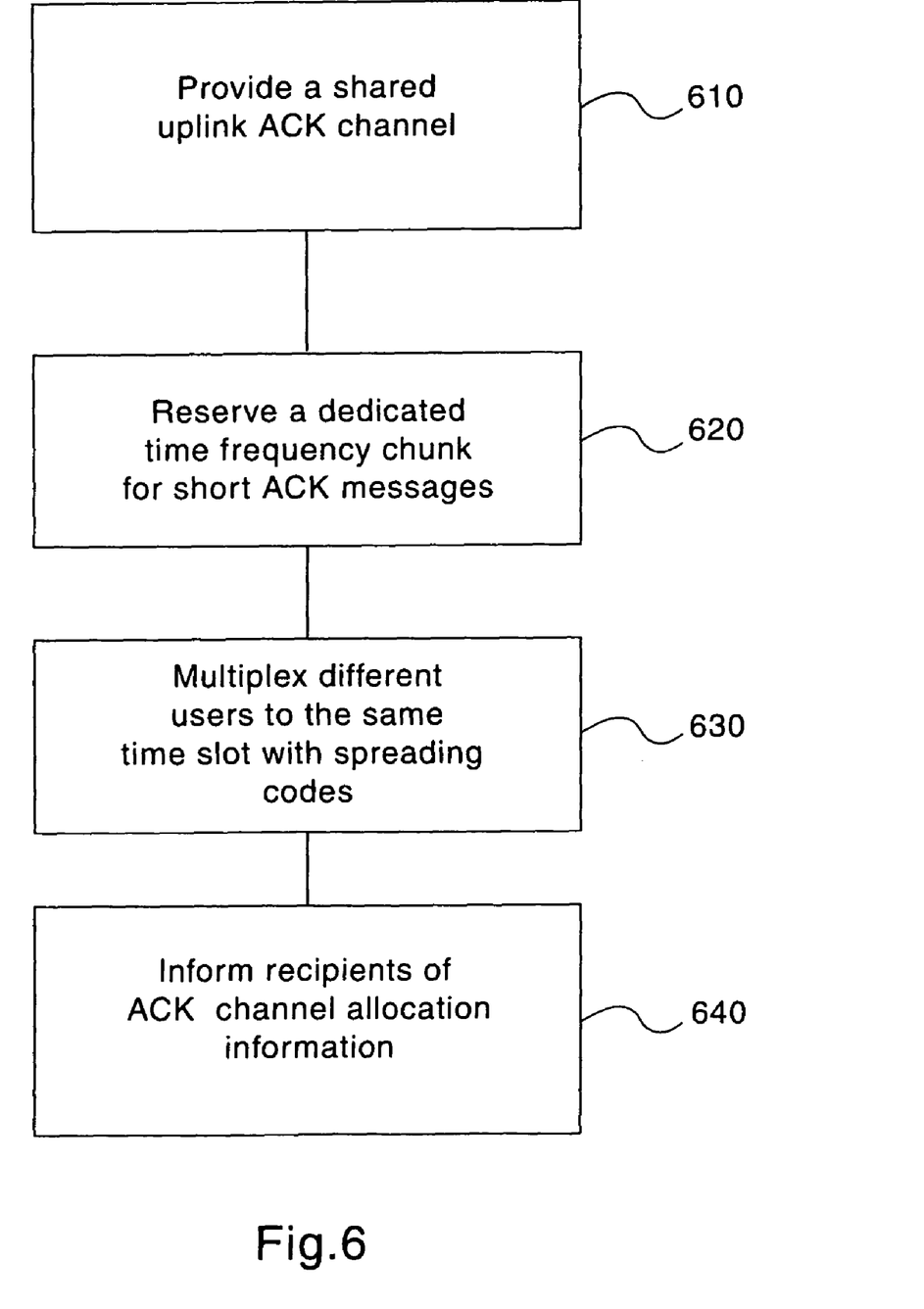
FIG. 6 illustrates a method according to one embodiment of the present invention.

FIG. 6 illustrates a method according to one embodiment of the present invention. As shown in FIG. 6, a shared uplink ACK channel can be provided 610. Providing 610 a shared uplink ACK channel can constitute providing a shared uplink ACK channel as part of a first chunk the uplink time segment of an OFDMA framework. A dedicated time frequency chunk can be reserved 620 for short ACK messages. Multiple users can be multiplexed 630 to the same time slot with spreading codes. The spreading codes can, for example, by MC-CDMA codes. Recipients can be informed 640 of ACK channel allocation information. Recipients can be informed 640 in a payload message rather than using a broadcast control channel message. Alternatively, recipients can be informed 640 in a broadcast control channel message. This informing 640 can be done through concatenation to the first message of the data transfer and/or whenever allocation should change.

Figure 7:
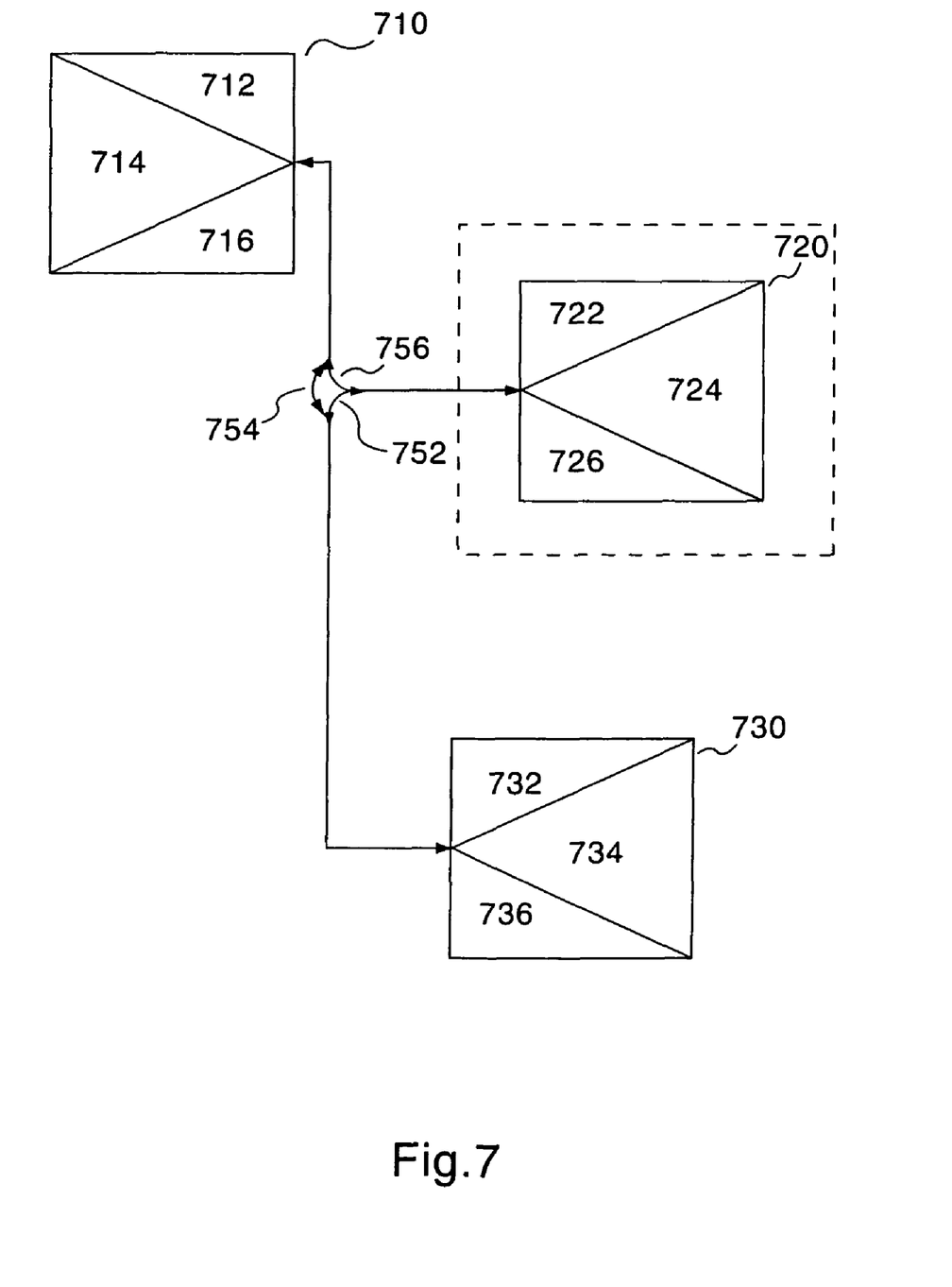
FIG. 7 illustrates a system according to one embodiment of the present invention, including a base station, a relay node, and a user equipment.

FIG. 7 illustrates a system according to one embodiment of the present invention. As shown in FIG. 7, the system can include a user equipment 710, a relay node 720, and a base station 730. Relay node 720 can be an optional feature of the system. For example, if there is a direct communication path 754 between the user equipment and the base station 730, then the relay node 720 may be unnecessary. However, the base station 730 can communicate with the user equipment 710 indirectly by communicating with the relay node along a second communication path 752; the relay node 720 communicating with the base station 710 along a third communication path 756. The relay node 720 can, for example, function as a repeater. Multiple relay nodes 720 can be arranged to form a relay/mesh network between the base station 730 and the user equipment 710.

The relay node 720 can include a processor 724, a reception module 722 that is able to receive a signal, and a transmission module 726 that is able to transmit a signal. The processor 724, reception module 722, and transmission module 726 can be implemented using computer hardware, software, or a combination thereof. The relay node can be designed to transfer signals from the base station 730 to the user equipment 710 or to another relay node 720. The processor 724 can include a memory.

The base station 730 can include a processor 734, a reception module 732 that is able to receive a signal, and a transmission module 736 that is able to transmit a signal. The processor 734, reception module 732, and transmission module 736 can be implemented using computer hardware, software, or a combination thereof. The base station can be a base station of a third generation partnership project (3GPP) network. The processor 734 can include a memory. The processor 734 can be designed to provide a shared uplink ACK channel for user equipment 710 that is connected to the base station 730. The processor 734 can also be designed to reserve a dedicated time frequency chunk for short ACK messages from the user equipment 710. The processor 734 can further be designed to multiplex different users to the same time slot using spreading codes. The processor 734 can be configured to use the transmission module 736 to communicate to the different users ACK channel allocation information. The processor 734 can be configured to transmit such information concatenated at the end of a payload message.

The user equipment 710 can include a processor 714, a reception module 712 that is able to receive a signal, and a transmission module 716 that is able to transmit a signal. The processor 714, reception module 712, and transmission module 716 can be implemented using computer hardware, software, or a combination thereof. The user equipment 710 can include a mobile telephone, a mobile videophone, a text messaging device, a communication-capable camera, a personal digital assistance, a personal computer, or the like. The user equipment 710 can be designed to be operated by or for a user of a communication service.

The processor 714 can be designed to receive an assignment for ACK channel allocation information. The processor 714 can also be designed to provide ACK messages in a multiplexed time slot using spreading codes. The processor 714 can, thus, be designed to communicate short ACK messages in a shared uplink ACK channel.

One having ordinary skill in the art will readily understand that the invention as discussed above may be practiced with steps in a different order, and/or with hardware elements in configurations that are different than those that are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

What is claimed is:

1. A system, comprising:
a plurality of terminals; and
a base station configured to provide a shared uplink ACK channel, to reserve a dedicated time frequency chunk for short ACK messages, to multiplex the plurality of terminals to the same time slot using spreading codes, and to inform the plurality of terminals of their respective channel allocation information, wherein the plurality of terminals are configured to receive their respective channel allocation information and provide ACK messages according to their respective channel allocation, wherein the shared uplink ACK channel is a channel in which multiple users are multiplexed to a same time-frequency allocation using spreading codes.

2. The system of claim 1, wherein the plurality of terminals are configured to receive their respective channel allocation information in at least one of a payload of a payload message or broadcast control message.

3. The system of claim 1, wherein the base station is configured to inform the plurality of terminals of their respective channel allocations by concatenating the respective channel allocation information to a first message of a data transfer.

4. The system of claim 1, wherein the base station is configured to inform the plurality of terminals of their respective channel allocations by concatenating the respective channel allocation information to a message of a data transfer that is being sent when a change in allocation is desired.

5. The system of claim 1, wherein the base station is configured to inform the plurality of terminals of their respective channel allocations by informing the terminals of their respective time, frequency, and spreading code for acknowledgement.

6. The system of claim 1, wherein the system is configured to use at least one of orthogonal frequency division multiplexing or orthogonal frequency divisional multiple access.

7. An apparatus, comprising:
at least one memory including computer program code; and
at least one processor,
wherein the at least one memory and the computer program code are configured to, with the at least one processor, cause the apparatus at least to
provide a shared uplink ACK channel,
reserve a dedicated time frequency chunk for short ACK messages,
multiplex the plurality of terminals to the same time slot using spreading codes, and
inform the plurality of terminals of their respective channel allocation information,
wherein the plurality of terminals are configured to receive their respective channel allocation information and provide ACK messages according to their respective channel allocation, and
wherein the shared uplink ACK channel is a channel in which multiple users are multiplexed to a same time-frequency allocation using spreading codes.

8. The apparatus of claim 7, wherein the at least one memory and the computer program code are also configured to, with the at least one processor, cause the apparatus at least to inform a respective terminal of the plurality of terminals in at least one of a payload of a payload message to the respective terminal or a broadcast control message.

9. The apparatus of claim 7, wherein the apparatus comprises at least one of a base station, an access point, or an access gateway.

10. The apparatus of claim 7, wherein the apparatus comprises at least one of a relay node or a mesh node.

11. The apparatus of claim 7, wherein the node is configured to inform the plurality of terminals of their respective channel allocations by concatenating the respective channel allocation information to a first message of a data transfer.

12. The apparatus of claim 7, wherein the at least one memory and the computer program code are also configured to, with the at least one processor, cause the apparatus at least to inform the plurality of terminals of their respective channel allocations by concatenating the respective channel allocation information to a message of a data transfer that is being sent when a change in allocation is desired.

13. The apparatus of claim 7, wherein the at least one memory and the computer program code are also configured to, with the at least one processor, cause the apparatus at least to inform the plurality of terminals of their respective channel allocations by informing the terminals of their respective time, frequency, and spreading code for acknowledgement.

14. The apparatus of claim 7, wherein the at least one memory and the computer program code are also configured to, with the at least one processor, cause the apparatus at least to use at least one of orthogonal frequency division multiplexing or orthogonal frequency divisional multiple access.

15. An apparatus, comprising:
at least one memory including computer program code; and
at least one processor,
wherein the at least one memory and the computer program code are configured to, with the at least one processor, cause the apparatus at least to receive shared uplink ACK channel allocation information from a base station configured to provide a shared uplink ACK channel, to reserve a dedicated time frequency chunk for short ACK messages, to multiplex a plurality of terminals to the same time slot using spreading codes, and to inform the plurality of terminals of their respective channel allocation information,
wherein the at least one memory and the computer program code are also configured to, with the at least one processor, cause the apparatus at least to provide ACK messages according to the apparatus' respective channel allocation, and
wherein the shared uplink ACK channel is a channel in which multiple users are multiplexed to a same time-frequency allocation using spreading codes.

16. The apparatus of claim 15, wherein the at least one memory and the computer program code are also configured to, with the at least one processor, cause the apparatus at least to receive the shared uplink ACK channel allocation information in at least one of a payload of a payload message or in a broadcast control message.

17. The apparatus of claim 15, wherein the apparatus comprises at least one of a user equipment, a mobile node, or a mobile terminal.

18. The apparatus of claim 15, wherein the at least one memory and the computer program code are also configured to, with the at least one processor, cause the apparatus at least to receive the shared uplink ACK channel allocation information concatenated to a first message of a data transfer.

19. The apparatus of claim 15, wherein the at least one memory and the computer program code are also configured to, with the at least one processor, cause the apparatus at least to receive the shared uplink ACK channel allocation information concatenated to a message of a data transfer that is being sent when a change in allocation is needed.

20. The apparatus of claim 15, wherein the at least one memory and the computer program code are also configured to, with the at least one processor, cause the apparatus at least to receive the shared uplink ACK channel allocation information comprising the terminal's respective time, frequency, and spreading code for acknowledgement.

21. The apparatus of claim 15, wherein the at least one memory and the computer program code are also configured to, with the at least one processor, cause the apparatus at least to use at least one of orthogonal frequency division multiplexing or orthogonal frequency divisional multiple access.

22. A method, comprising:
providing, by a base station, a shared uplink ACK channel;
reserving a dedicated time frequency chunk for short ACK messages;
multiplexing different users to the same time slot with spreading codes; and
informing the different users of ACK channel allocation information,
wherein a plurality of terminals of the different users are configured to receive their respective channel allocation information and provide ACK messages according to their respective channel allocation, and
wherein the shared uplink ACK channel is a channel in which multiple users are multiplexed to a same time-frequency allocation using spreading codes.

23. The method of claim 22, wherein the multiplexing different users using spreading codes comprises using multi-carrier code division multiple access codes.

24. The method of claim 22, wherein the informing the different users of ACK channel allocation information comprises concatenating the allocation information for a respective user of the different users at the end of a payload message addressed to the respective user.

25. The method of claim 22, wherein the informing the different users of ACK channel allocation information comprises informing the different users of ACK channel allocation information in a broadcast control message.

26. The method of claim 22, wherein the informing the different users of ACK channel allocation information comprises concatenating the respective channel allocation information to a message of a data transfer that is being sent when a change in allocation is desired.

27. The method of claim 22, wherein the informing the different users of ACK channel allocation information comprises informing the users of their respective time, frequency, and spreading code for acknowledgement.

28. The method of claim 22, wherein the providing the shared uplink ACK channel comprises at least one of orthogonal frequency division multiplexing or orthogonal frequency divisional multiple access.

29. A method, comprising:
receiving, at a terminal, shared uplink ACK channel allocation information from a base station configured to provide a shared uplink ACK channel, to reserve a dedicated time frequency chunk for short ACK messages, to multiplex the plurality of terminals to the same time slot using spreading codes, and to inform the plurality of terminals of their respective channel allocation information; and
providing ACK messages according to a respective shared uplink ACK channel allocation,
wherein the shared uplink ACK channel is a channel in which multiple users are multiplexed to a same time-frequency allocation using spreading codes.

30. The method of claim 29, wherein the receiving comprises receiving the shared uplink ACK channel allocation information in at least one of a payload of a payload message, or in a broadcast control message.

31. The method of claim 29, wherein the receiving comprises receiving the shared uplink ACK channel allocation information concatenated to a first message of a data transfer.

32. The method of claim 29, wherein the receiving comprises receiving the shared uplink ACK channel allocation information concatenated to a message of a data transfer that is being sent when a change in allocation is needed.

33. The method of claim 29, wherein the receiving comprises receiving a respective time, frequency, and spreading code for acknowledgement.

34. The method of claim 29, wherein the providing comprises using at least one of orthogonal frequency division multiplexing or orthogonal frequency divisional multiple access.

35. A non-transitory computer readable medium encoded with instructions capable of being executed by a computer to perform a process, the process comprising:

reserving a dedicated time frequency chunk for short ACK messages;

multiplexing different users to the same time slot with spreading codes; and informing the different users of ACK channel allocation information, wherein a plurality of terminals of the different users are configured to receive their respective channel allocation information and provide ACK messages according to their respective channel allocation, and wherein the shared uplink ACK channel is a channel in which multiple users are multiplexed to a same time-frequency allocation using spreading codes.

36. A non-transitory computer readable medium encoded with instructions capable of being executed by a computer to perform a process, the process comprising:

receiving shared uplink ACK channel allocation information from a base station configured to provide a shared uplink ACK channel, to reserve a dedicated time frequency chunk for short ACK messages, to multiplex the plurality of terminals to the same time slot using spreading codes, and to inform the plurality of terminals of their respective channel allocation information;

providing ACK messages according to a respective shared uplink ACK channel allocation in the payload, wherein the shared uplink ACK channel is a channel in which multiple users are multiplexed to a same time-frequency allocation using spreading codes.

* * * * *